(12) United States Patent
Park et al.

(10) Patent No.: US 10,268,107 B2
(45) Date of Patent: Apr. 23, 2019

(54) CAMERA MODULE

(71) Applicant: LG INNOTEK CO., LTD., Seoul (KR)

(72) Inventors: Je Kyung Park, Seoul (KR); Myoung Jin An, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/748,072

(22) PCT Filed: Jul. 25, 2016

(86) PCT No.: PCT/KR2016/008078
§ 371 (c)(1),
(2) Date: Jan. 26, 2018

(87) PCT Pub. No.: WO2017/018754
PCT Pub. Date: Feb. 2, 2017

(65) Prior Publication Data
US 2018/0210320 A1    Jul. 26, 2018

(30) Foreign Application Priority Data

Jul. 27, 2015  (KR) .................. 10-2015-0106134

(51) Int. Cl.
*G03B 17/08* (2006.01)
*B62D 41/00* (2006.01)
(Continued)

(52) U.S. Cl.
CPC ............ *G03B 17/08* (2013.01); *B62D 41/00* (2013.01); *C09J 163/10* (2013.01); *H04M 1/02* (2013.01);
(Continued)

(58) Field of Classification Search
CPC ........................................ G03B 17/08
(Continued)

(56) References Cited

U.S. PATENT DOCUMENTS 7,196,857 B2 * 3/2007 Kazama ............ G02B 7/006
257/E31.122
7,576,401 B1 * 8/2009 de Guzman ....... G02B 7/021
257/234

(Continued)

FOREIGN PATENT DOCUMENTS

JP         2009-222740 A    10/2009
KR   10-2006-0015390 A     2/2006
(Continued)

*Primary Examiner* — Clayton E Laballe
*Assistant Examiner* — Kevin Butler
(74) *Attorney, Agent, or Firm* — Birch, Stewart, Kolasch & Birch, LLP

(57) ABSTRACT

The present invention relates to a camera module, comprising: a lens barrel including a body part, and an extension part extending outwardly from the body part; a front body including a through hole into which the body part is inserted, and a placing part on the top of which the extension part is disposed; and an adhesive disposed between the extension part and the placing part, wherein a concave-convex part may be formed on the placing part. The present invention has an effect of enhancing adhesive force between the lens barrel and the front body, thereby maintaining airtightness of an inner space and improving reliability and stability.

10 Claims, 3 Drawing Sheets

(51) Int. Cl.
*H04M 1/02* (2006.01)
*C09J 163/10* (2006.01)
*H04N 5/225* (2006.01)
*G03B 17/56* (2006.01)
*G03B 17/14* (2006.01)

(52) U.S. Cl.
CPC ........... *H04N 5/2254* (2013.01); *G03B 17/14* (2013.01); *G03B 17/56* (2013.01); *G03B 2219/045* (2013.01)

(58) Field of Classification Search
USPC .......................................................... 396/25
See application file for complete search history.

(56) References Cited

U.S. PATENT DOCUMENTS

| | | | | |
|---|---|---|---|---|
| 9,385,153 | B2* | 7/2016 | Luan | H01L 27/14636 |
| 9,525,002 | B2* | 12/2016 | Wong | H01L 27/14636 |
| 9,876,948 | B2* | 1/2018 | Wang | H04N 5/2257 |
| 9,900,487 | B2* | 2/2018 | Wang | H04N 5/2257 |
| 9,921,388 | B2* | 3/2018 | Park | G02B 7/08 |
| 2007/0126081 | A1* | 6/2007 | Webster | H01L 27/14618 |
| | | | | 257/565 |
| 2008/0013187 | A1* | 1/2008 | Craen | G02B 3/14 |
| | | | | 359/665 |
| 2008/0252771 | A1* | 10/2008 | Wu | H04N 5/2254 |
| | | | | 348/340 |
| 2008/0303939 | A1* | 12/2008 | Hsu | H01L 27/14618 |
| | | | | 348/374 |
| 2009/0033790 | A1* | 2/2009 | Lin | G02B 7/023 |
| | | | | 348/374 |
| 2010/0247086 | A1* | 9/2010 | Tallaron | G02B 3/14 |
| | | | | 396/133 |
| 2012/0105713 | A1* | 5/2012 | Luan | H04N 5/2251 |
| | | | | 348/374 |
| 2013/0344915 | A1* | 12/2013 | Kim | G02B 7/08 |
| | | | | 455/556.1 |
| 2015/0077840 | A1* | 3/2015 | Kim | G02B 7/08 |
| | | | | 359/355 |
| 2015/0138436 | A1* | 5/2015 | Wong | H04N 5/2257 |
| | | | | 348/374 |
| 2015/0316745 | A1* | 11/2015 | Chen | H02K 41/035 |
| | | | | 359/824 |
| 2016/0320585 | A1* | 11/2016 | Park | G02B 27/646 |
| 2017/0244872 | A1* | 8/2017 | Wang | H04N 5/2252 |
| 2017/0245363 | A1* | 8/2017 | Wang | G02B 7/09 |
| 2017/0271390 | A1* | 9/2017 | Wang | H01L 27/14618 |
| 2017/0272636 | A1* | 9/2017 | Wang | H01L 27/14618 |
| 2017/0280027 | A1* | 9/2017 | Wang | H01L 27/14618 |
| 2018/0007244 | A1* | 1/2018 | Wang | H04N 5/2252 |
| 2018/0035022 | A1* | 2/2018 | Wang | H04N 5/2253 |
| 2018/0035028 | A1* | 2/2018 | Wang | H04N 5/2257 |
| 2018/0035029 | A1* | 2/2018 | Wang | H04N 5/2257 |
| 2018/0035032 | A1* | 2/2018 | Wang | B29C 43/52 |
| 2018/0048798 | A1* | 2/2018 | Wang | H01L 27/14618 |

FOREIGN PATENT DOCUMENTS

| | | | | |
|---|---|---|---|---|
| KR | 20060015390 | * | 2/2006 | ............ G02B 26/10 |
| KR | 10-2011-0016155 A | | 2/2011 | |
| KR | 20110016155 | * | 2/2011 | ............ G02B 7/025 |
| KR | 10-1453006 B1 | | 10/2014 | |
| KR | 10-2014-0136726 A | | 12/2014 | |

* cited by examiner

CAMERA MODULE

CROSS REFERENCE TO RELATED APPLICATIONS

This application is the National Phase of PCT International Application No. PCT/KR2016/008078, filed on Jul. 25, 2016, which claims priority under 35 U.S.C. 119(a) to Patent Application No. 10-2015-0106134, filed in the Republic of Korea on Jul. 27, 2015, all of which are hereby expressly incorporated by reference into the present application.

TECHNICAL FIELD

The teachings in accordance with exemplary and non-limiting embodiments of this invention relate generally to a camera module, and more particularly to a camera module used for a vehicle.

BACKGROUND ART

Concomitant with widely generalized dissemination of various mobile terminals and commercialization of wireless Internet services, demands by consumers related to mobile terminals are diversified to prompt various types of peripheral devices or additional equipment to be mounted on mobile terminals. Inter alia, camera modules may be one of the representative items photographing an object in a still picture or a video, storing an image thereof, and editing and transmitting the image as occasion arises.

Recently, demands have greatly increased on miniaturized camera modules for multifarious multimedia fields including note-type personal computer, camera phones, PDAs, smart phones and toys, video input devices including information terminals for monitoring cameras, and video tape recorders and vehicular cameras.

Particularly, as demands have increased on driver convenience and safety in the automobile industries, new technologies assisting a driver by attaching a camera on a vehicle are variably grafted, and technologies using cameras are briskly fused with software technologies. Representatively, camera modules used for front and rear cameras and black boxes may be examples thereof.

However, because, parts used for vehicles, particularly, camera modules contain important data directly related to safety of passengers and grasp/understanding of circumstances of affairs/accidents, the camera modules require high reliability including sturdy solid coupling and strict waterproof for characteristics thereof.

DETAILED DESCRIPTION OF THE INVENTION

Technical Subject

The present invention is to solve the abovementioned problems/disadvantages, and it is an object of the present invention to provide a camera module configured to enhance adhesive force between the lens barrel and the front body, thereby maintaining airtightness of an inner space and improving reliability and stability.

Technical Solution

In one general aspect of the present invention, there is provided a camera module, the camera module comprising: a lens barrel including a body part, and an extension part extending outwardly from the body part; a front body including a through hole into which the body part is inserted, and a placing part on the top of which the extension part is disposed; and an adhesive disposed between the extension part and the placing part, wherein a concave-convex part may be formed on the placing part.

Preferably, but not necessarily, the placing part may include a first surface formed outwardly of the concave-convex part in opposition to the extension part about an optical axis, wherein the concave-convex part is formed by being more recessed than the first surface.

Preferably, but not necessarily, the placing part may include a second surface arranged at an inner side of the concave-convex part about an optical axis, and the second surface may be formed in opposition to the extension part by being arranged higher than a bottom end of the concave-convex part.

Preferably, but not necessarily, the placing part may include a first surface formed at outside of the concave-convex part in opposition to the extension part about an optical axis, and a second surface arranged at an inner side of the concave-convex part about an optical axis, wherein the first and second surfaces may have a mutually different height.

Preferably, but not necessarily, a difference between the height of the first surface and the height of the second surface may be greater than 40 µm, but less than 160 µm.

Preferably, but not necessarily, a surface roughness (Ra) of the concave-convex part may be greater than 5 µm, but less than 50 µm.

Preferably, but not necessarily, the adhesive may be initially cured in the process of an alignment between an optical axis of a lens part and an image sensor mounted on a substrate part, and finally cured while the alignment between the optical axis of the lens part and the image sensor is realized.

Preferably, but not necessarily, the initial curing of the adhesive may be a UV (Ultraviolet) curing.

Preferably, but not necessarily, the final curing may be a heat curing realized at 75° C.~90° C.

Preferably, but not necessarily, the adhesive may be of an acrylic epoxy.

Advantageous Effects

The present invention has an advantageous effect of enhancing adhesive force between a lens barrel and a front body, thereby maintaining airtightness of an inner space and improving reliability and stability.

BEST MODE

Figure 1:
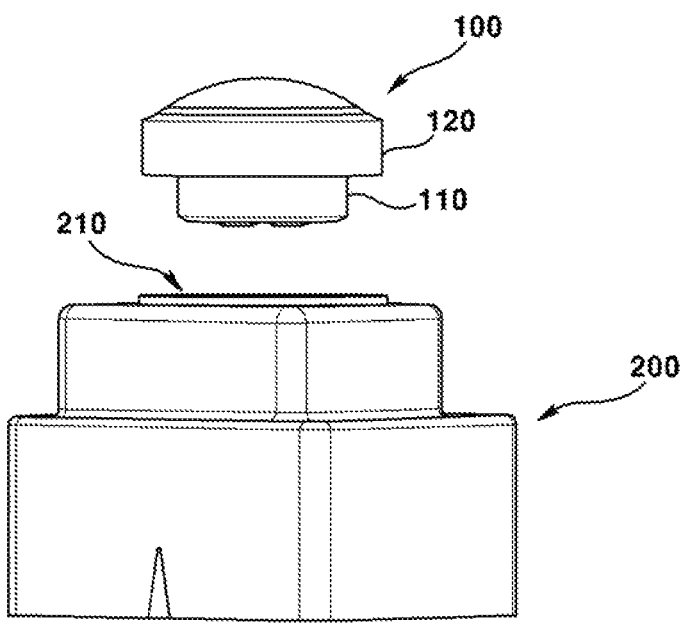
FIG. 1 is a schematic view illustrating a camera module according to an exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

Now, a camera module according to an exemplary embodiment of the present invention will be described with reference to the accompanying drawings.

Figure 2:
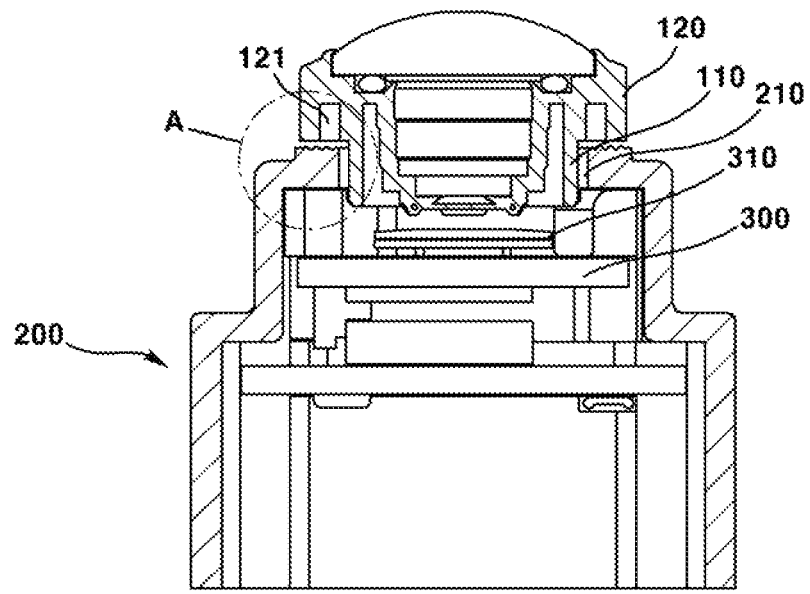
FIG. 2 is a cross-sectional view illustrating a camera module according to an exemplary embodiment of the present invention.
Figure 3:
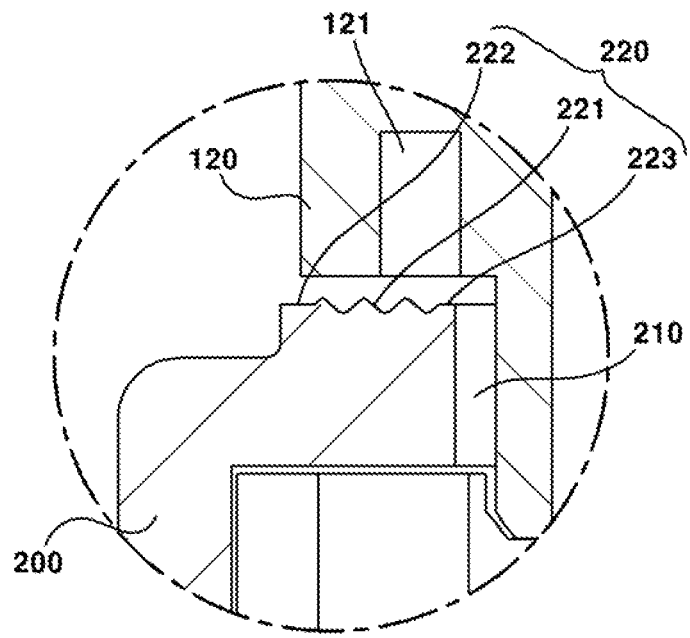
FIG. 3 is an enlarged schematic view of "A" section of FIG. 2.

FIG. 1 is a schematic view illustrating a camera module according to an exemplary embodiment of the present invention, FIG. 2 is a cross-sectional view illustrating a camera module according to an exemplary embodiment of the present invention, and FIG. 3 is an enlarged schematic view of "A" section of FIG. 2.

Referring to FIGS. 1 and 2, the camera module according to an exemplary embodiment of the present invention may include a lens barrel (100) and a front body (200), wherein the lens barrel (100) and the front body (200) may be adhered by an adhesive (not shown).

The lens barrel (100) may accommodate and fix lenses (not shown) by aligning at least one lens (not shown) along an optical axis. The lens barrel (100) may include a body part (110) and an extension part (120). The body part (110) may have a shape of wrapping the lens and a portion of the body part (110) may be inserted into a through hole (210) of the front body (200, described later). The extension part (120) may be protrusively extended to an outside from the body part (110), and may face an upper surface of the front body (200, described later).

Referring to FIGS. 1, 2 and 3, the front body (200) may be formed at one side with a through hole (210), wherein the through hole (210) may be inserted by at least one portion of the lens barrel (100), i.e., the body part (110), to allow the front body (200) and the lens barrel (100) to be coupled. At this time, the front body (200) and the lens barrel (100) may be coupled by an adhesive or screw-connected, where the coupling using the adhesive and the coupling by screw-connection may be applied at the same time. The front body (200) may be adhered in such a manner that a placing part (220) formed at an upper surface faces a bottom surface of the extension part (120) of the lens barrel (100) and is adhered by an adhesive (described later).

Referring to FIG. 3, the adhesive may be infused into between the placing part (220) and the extension part (120) by a user to allow the lens barrel (100) and the front body (200) to be adhered. Furthermore, the placing part (220) may include a first surface (222) and the first surface (222) may be formed with an extended roughly-formed concave-convex (221). Furthermore, the adhesive may be coated on the concave-convex part to elongate an adhered area with the front body (200), whereby the adhesive force can be further reinforced. However, it is a simple example and the present invention is not limited thereto, and the placing part (220) may not be formed with the first surface (222), and but instead formed only with the concave-convex part (221). A second surface (223) may be further formed at an inner side of the concave-convex part (221) and any shape may be applicable as long as an adhered area is increased by the concave-convex part depending on a manufacturer's intention.

Still furthermore, the concave-convex part (221) may be roughly formed in order to increase an area abutted by the adhesive as a means to reinforce an adhesive force of the adhesive, and may be formed by various means including etching or laser processing. At this time, a surface roughness (Ra) of the concave-convex part (221) may be greater than 5 μm but less than 50 μm. When the surface roughness (Ra) of the concave-convex part (221) is formed less than 5 μm, the surface roughness may be close to that of a plane surface to thereby reduce the adhesive force due to reduced adhesive area within the concave-convex part (221). Furthermore, when the surface roughness (Ra) of the concave-convex part (221) is formed greater than 50 μm, an amount of adhesive accommodated into the concave-convex part (221) may relatively be more required, such that when adhesive is coated in a same amount of adhesive as a predetermined amount, the adhesive may not be abutted to the extension part (120) to decrease the adhesive force. Meantime, the surface roughness (Ra) of the placing part (220) may be greater than 5 μm but less than 50 μm.

Figure 4:
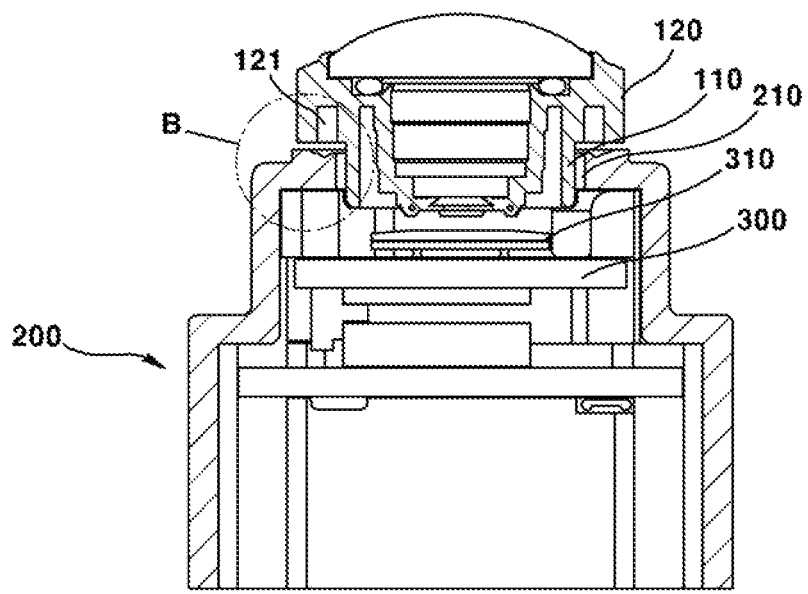
FIG. 4 is a cross-sectional view illustrating a camera module according to an exemplary embodiment of the present invention.
Figure 5:
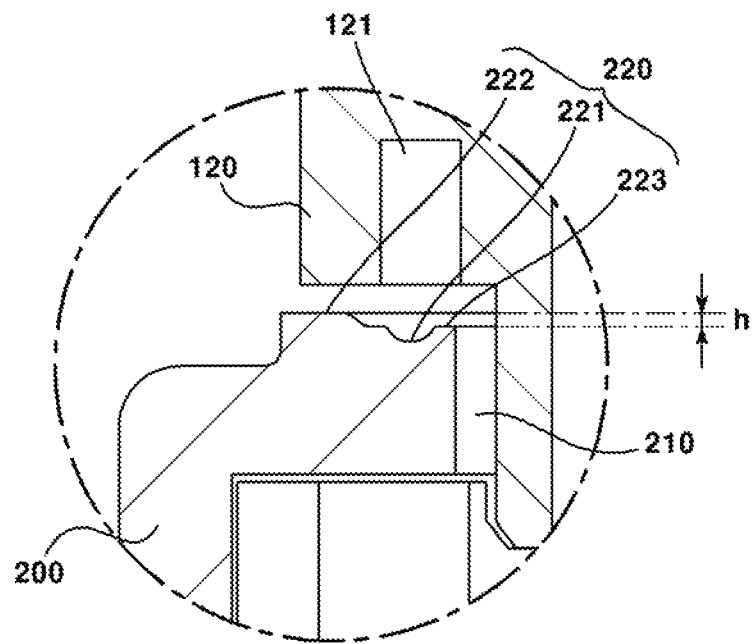
FIG. 5 is an enlarged schematic view of "B" section of FIG. 4.

FIG. 4 is a cross-sectional view illustrating a camera module according to an exemplary embodiment of the present invention, and FIG. 5 is an enlarged schematic view of "B" section of FIG. 4.

FIGS. 4 and 5 illustrate a state where the concave-convex part (221) is formed to be recessed in the placing part (220). That is, a groove may be formed at the placing part (220), and the groove may be formed with the concave-convex part (221). The placing part (220) may be formed with a jaw (no reference numeral) formed by the first surface (222) and the second surface (223) of the concave-convex part (221). In other words, the first surface (222) may be extensively formed to an outside of the concave-convex part (221) about an optical axis, and the jaw may be extensively formed to an inside of the concave-convex part 221) about an optical axis. The jaw may prevent or reduce overflow of adhesive into an inside of the front body (200). At this time, the first and second surfaces (222, 223) may have a mutually different height. For example, the first surface (222) may be formed higher than the second surface (223). For example, the first surface (222) may be formed lower than the second surface (223). A difference between the height of the first surface and the height of the second surface may be preferably greater than 40 μm, but less than 160 μm.

As illustrated in the drawings, the first surface (222) is formed higher than the second surface (223), the purpose of which is to allow more adhesive to flow nearer to an optical axis than to a direction distancing from the optical axis, whereby adhesion between the front body (200) and the lens barrel (100) can be further reinforced. When a difference between a height of the first surface (222) and a height of the second surface (223) is formed less than 40 μm, inducement of adhesive to a second surface (223) side cannot be easy due to pressure when the extension part (120) and the placing part (220) are adhered, and when a difference between a height of the first surface (222) and a height of the second surface (223) is formed greater than 160 μm, the adhesive may overflow to the through hole (210) of the front body (200) to make it difficult to adhere because there is no sufficient amount of adhesive accommodated into the concave-convex part (221).

That is, when a difference between a height of the first surface (222) and a height of the second surface (223) is formed less than 40 μm, the adhesive force may be weakened, and when a difference between a height of the first surface (222) and a height of the second surface (223) is formed greater than 160 μm, the adhesive force may be weakened, or the adhesive may overflow into an inside of the front body (200). Furthermore, the concave-convex part (221) may be roughly formed on a surface thereof in order to increase an area abutted by the adhesive as a means to reinforce the adhesive force of the adhesive, and may be formed through various means such as etching or a laser processing.

At this time, the surface roughness (Ra) of the concave-convex part (220) may be greater than 5 μm but less than 50 μm. When the surface roughness (Ra) of the concave-convex part (221) is formed less than 5 μm, the surface roughness may be close to that of a plane surface to thereby reduce the adhesive force due to reduced adhesive area within the concave-convex part (221), and when the surface roughness (Ra) of the concave-convex part (221) is formed greater than 50 μm, an amount of adhesive accommodated into the concave-convex part (221) may be reduced to weaken the adhesive force. Meantime, the surface roughness (Ra) of the placing part (220) may be greater than 5 μm, but less than 50 μm.

The adhesive may be initially cured in the process of adjustment of alignment between an optical axis of a lens part (no reference numeral) and an image sensor (310) mounted on a substrate part (300), and a final cure is implemented while the alignment between the optical axis of the lens part and the image sensor is realized, whereby adhesion between the lens barrel (100) and the front body (200) of the camera module can be completed. At this time, the initial curing of the adhesive is a UV (Ultraviolet) curing, and the final curing of the adhesive may be preferably a heat curing realized at 75° C.~90° C. (more preferably at 80° C.~85° C.). The adhesive may be of an acrylic epoxy.

When the heat curing is realized at more than 90° C., the lens made of plastic may be damaged. Meantime, although it is explained that the adhesive is of an acrylic epoxy according to the present invention, the adhesive may be used with various means as long as the adhesion between the front body (200) and the lens barrel (100) can be performed according to a user's intention, and the curing method may be changed depending on the use of different adhesives.

Although not illustrated in the drawings, the other side of the front body (200) may be provided with a rear body (no reference numeral) whereby an inner space can be provided. The inner space may be accommodated with elements such as a PCB (Printed Circuit Board, no reference numeral) and an image sensor (310) for implementation of camera module according to the present invention in order to convert a light received through the lens part to an electrical signal.

Furthermore, as illustrated in FIGS. 2 to 5, the extension part (120) may be formed with a groove (121) facing the placing part (220). At this time, the adhesive may be inserted into the groove (121) when the extension part (120) and the placing part (220) are adhered by the adhesive, whereby the adhesive force may be strengthened. However, a shape of the groove (121) may depend on the manufacturer's intention.

The camera module according to an exemplary embodiment of the present invention may be assembled in the following fashion.

First, a substrate mounted with an image sensor (310) may be accommodated into the front body (200). Then, a through hole (210) formed on the front body (200) may be inserted with at least one portion of the body part (110) of the lens barrel (100) contained with a lens, whereby the placing part (220) of the front body (200) and the extension part (120) of the lens barrel (100) can face each other.

Next, an adhesive is coated on the placing part (220) of the front body (200). That is, coating of adhesive on the placing part (220) may place the adhesive between the placing part (220) and the extension part (120). The placing part (220) may be formed with a concave-convex part (221) to enlarge an adhered area between the lens barrel (100) and the front body (200), whereby the adhesive force can be strengthened. At this time, an alignment may be adjusted in order to match an optical axis of the lens and an optical axis of the image sensor (310) before the adhesive is dried. Furthermore, the adhesive is initially cured using a UV curing at the same time.

Successively, the camera module according to an exemplary embodiment of the present invention is heat cured at a temperature of 75° C.~90° C. to couple the front body (200) and the rear body (no reference numeral) to thereby complete the assembly of the camera module according to the exemplary embodiment of the present invention. However, an assembly order of the camera module according to the exemplary embodiment of the present invention is not limited to the abovementioned assembly order, and may be changed depending on the manufacturer's intent or assembling circumstances. For example, although the above explanation has described that the lens barrel (120) is inserted into the front body (200) and the placing part (220) is coated with the adhesive, it is also possible to first coat the adhesive on the placing part (220) and then the lens barrel (120) is inserted into the through hole (210) of the front body (200) to adhere the extension part (120) and the placing part (220) by facing each other. Thus, the assembly order is not limited to any one of the above mentioned methods.

Although the aforesaid explanations are simply exemplary embodiments to describe the camera module according to the present invention, the present invention is not limited thereto, and therefore, it should be understood that numerous other modifications and embodiments can be devised by those skilled in the art that will fall within the spirit and scope of the principles of this disclosure.

The invention claimed is:

1. A camera module, the camera module comprising:
   a lens barrel including a body part and an extension part extending outwardly from the body part;
   a front body including a through hole into which the body part is inserted, and a placing part on the top of which the extension part is disposed; and
   an adhesive disposed between the extension part and the placing part,
   wherein a concave-convex part is formed on the placing part, wherein the placing part includes a first surface formed at outside of the concave-convex part about an optical axis, and a second surface arranged at an inner side of the concave-convex part about an optical axis, and wherein the first and second surfaces have a mutually different height.

2. The camera module of claim 1, wherein the concave-convex part is formed by being more recessed than the first surface.

3. The camera module of claim 1, wherein the second surface is formed in opposition to the extension part by being arranged higher than a bottom end of the concave-convex part.

4. The camera module of claim 1, wherein a difference between the height of the first surface and the height of the second surface is greater than 40 μm, but less than 160 μm.

5. The camera module of claim 1, wherein a surface roughness (Ra) of the concave-convex part is greater than 5 μm, but less than 50 μm.

6. The camera module of claim 1, wherein the adhesive is initially cured in the process of an alignment between an optical axis of a lens part and an image sensor mounted on a substrate part, and finally cured while the alignment between the optical axis of the lens part and the image sensor is realized.

7. The camera module of claim 6, wherein the initial curing of the adhesive is a UV (Ultraviolet) curing.

8. The camera module of claim 6, wherein the final curing is a heat curing realized at 75° C.~90° C.

9. The camera module of claim 1, wherein the adhesive is of an acrylic epoxy.

10. The camera module of claim 1, wherein the extension part is formed with a groove facing the placing part.

* * * * *